United States Patent
Heckert

[15] 3,691,218
[45] Sept. 12, 1972

[54] PREPARATION OF VICINAL GLYCOLS FROM VICINAL DIHALIDES

[72] Inventor: David Clinton Heckert, Oxford, Ohio

[73] Assignee: The Procter & Gamble Company, Cincinnati, Ohio

[22] Filed: June 29, 1970

[21] Appl. No.: 51,024

[52] U.S. Cl............260/410.7, 260/413, 260/488 R, 260/615 R, 260/636, 260/618 B, 260/631 R
[51] Int. Cl...............................................C07c 69/30
[58] Field of Search............260/413, 636, 640, 410.7

[56] References Cited

UNITED STATES PATENTS

| | | | |
|---|---|---|---|
| 901,905 | 10/1908 | Imbert | 260/413 |
| 2,056,976 | 10/1936 | Mnookin | 260/636 |
| 3,060,237 | 10/1962 | Bain | 260/636 |
| 3,157,705 | 11/1964 | Pearce | 260/640 |
| 3,562,315 | 2/1971 | Cookson et al. | 260/640 |

*Primary Examiner*—Lewis Gotts
*Assistant Examiner*—Ethel G. Love
*Attorney*—Jack D. Schaeffer and Richard C. Witte

[57] ABSTRACT

Process for preparing vicinal glycols which comprises hydrolyzing vicinal dihalides in an amide solvent.

12 Claims, No Drawings

PREPARATION OF VICINAL GLYCOLS FROM VICINAL DIHALIDES

BACKGROUND OF THE INVENTION

This invention relates to an improved process for the preparation of vicinal glycols.

Various reactions commonly used for preparing vicinal glycols include the condensation of aldehydes in the presence of sodium metal in moist ether, the condensation of ketones with magnesium in acetic acid solvent, and the like. Such reactions suffer from the disadvantage that the starting materials are often expensive and difficult to prepare.

An alternative prior art method for the preparation of vicinal glycols is the reaction of vicinal dihalides with sodium acetate to form the corresponding diacetate esters which can then be hydrolyzed to form the corresponding vicinal glycols.

Since vicinal dihalides are inexpensive materials, readily prepared from all manner of olefins, they are an attractive raw material for the preparation of the corresponding vicinal glycols. However, the prior art method of reacting vicinal dihalides with sodium acetate requires the preparation of reaction intermediates, i.e., the diacetate, followed by subsequent hydrolysis. Thus, this synthesis of vicinal glycols from vicinal dihalides is not commercially attractive.

A direct, single-step hydrolysis of vicinal dihalides to the corresponding vicinal glycols would obviously be of advantage. However, it is well-known that the reaction of vicinal dihalides in the solvents commonly employed for such hydrolyses, most generally organic acids, results in the elimination of hydrogen chloride and the formation of olefinic halides. Little, if any, glycolic compound is formed in such known hydrolyses. It has now been discovered that the hydrolysis of vicinal dihalides in an amide solvent results in the formation of vicinal glycols in a single-step reaction. The glycols prepared thereby find use as plasticizers and as additives in polyesters. Vicinal glycols also serve as starting materials in the preparation of carboxylic acids by the process described in the co-pending application of E. P. Pultinas, Jr., Ser. No. 51,023 filed June 29, 1970 now abandoned.

Accordingly, it is a primary object of the present invention to provide an improved process for the preparation of vicinal glycols from vicinal dihalides. This and other objects are obtained by the present invention as will become apparent from the following disclosure.

SUMMARY OF THE INVENTION

In general terms, the process of the present invention comprises reacting water with a vicinal dihalide having the formula

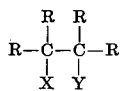

wherein X and Y are each selected from the group consisting of bromine, chlorine, and iodine, and each R is selected from the group consisting of hydrogen, alkyl, cycloalkyl, branched-chain alkyl, hydroxyalkyl, fluoroalkyl, alkoxyalkyl, nitroalkyl, and carboxyalkyl containing from about one to about 25 carbon atoms and aryl, e.g., phenyl, benzyl, phenylethyl, naphthyl, anthracenyl, and phenanthryl, in the presence of an amide solvent as hereinafter defined at a temperature of about 150° C to about 300° C. The R groups can contain any other substituents that do not react with water or with the amide solvent under the conditions of hydrolysis of the present invention. For example, preferred vicinal dihalides for use herein contain a carboxy substituent on one or more of the R groups. Compounds of this type are exemplified by the vicinal dihalide derivatives of various naturally-occurring unsaturated fatty acids and their alkyl and aryl esters, said fatty acids and esters having been halogenated at their position of olefinic unsaturation. For example, the vicinal dichloride derivatives of oleic acid, i.e., 9,10-dichlorostearic acid and the like, are readily converted to the corresponding glycols in the practice of the present invention.

Vicinal dihalides used herein can be prepared by the addition of free halogens to olefins in the manner well-known in the art. Halogens such as chlorine, bromine, iodine, bromine monochloride, iodine monobromide and iodine monochloride can be added to the olefinic double bond in gas phase reactions, liquid phase reactions, and in reactions wherein the olefin and halogen are co-dissolved in solvents such as hydrocarbons, perhalohydrocarbons and the like, to yield vicinal dihalides. Vicinal dichlorides, vicinal dibromides, vicinal diiodides, vicinal bromochlorides, vicinal iodochlorides, and vicinal iodobromides prepared in this manner are all suitable for use in the practice of this invention. Likewise, vicinal dihalides prepared by the catalytic, high temperature displacement of hydrogen from alkanes by halogens are also suitable. Vicinal dichlorides are preferred because of economic considerations. Vicinal difluorides are not suitable for use herein.

Any of the following exemplary cyclic and straight chain vicinal dihalides can be used to prepare corresponding glycols: 1,2-dichlorocyclopentane, 1,2-dibromocyclohexane, 1,2diiodocyclooctane, 1,2-dichlorocyclododecane, 1,2-dibromocycloeicosane, 1,2-dichlorocyclopentane, 1,2-dibromopentane, 2,3-dichloropentane, 1,2-dichlorohexane, 1,2-dibromohexane, 2,3-dichloroheptane, 2,3-diiodoheptane, 3,4-dichlorooctane, 1,2-dichlorooctane, 1-iodo-2-bromononane, 2-iodo-3-chlorononane, 3,4-dibromononane, 1,2-dichlorododecane, 1,2-dichlorotetradecane, 1,2-dibromohexadecane, 1,2-dichlorohexadecane, 1,2-dichlorooctadecane, 1,2-dichloroheneicosane and 1,2-dichlorotetraphenylethane. Preferred are 1,2-dichlorooctane, 1,2-dichlorodecane, 1,2-dichlorododecane, 1,2-dichlorotetradecane, 1,2-dichlorohexadecane and 1,2-dichlorooctadecane. The process for preparing vicinal glycols from vicinal dihalides herein disclosed works equally well with both terminal and internal vicinal dihalides.

Branched-chain vicinal dihalides are similarly suitable for use in the present process. Non-limiting examples of vicinal dihalides wherein the alkyl chain is branched suitable for use in the present process include 1,2-dichloro-2methylpentane 1,2-dichloro-2-ethylhexane and 4,5-dibromo-2-methyl-pentane, all of which undergo the novel reaction described herein and yield the corresponding vicinal glycol derivatives.

As hereinbefore noted, various vicinal dihalide compounds formed from unsaturated fatty acids and their esters, especially those obtainable from natural fats and waxes, are readily hydrolyzed to the corresponding glycols in the present process. For example, the vicinal dihalide derivatives of acids such as oleic acid, ricinoleic acid, palmitoleic acid, petroselenic acid, vaccenic acid, erucic acid, and the like can be prepared by the reaction of the parent acids with halogens in the manner hereinbefore noted. The vicinal dihalide derivatives of the acids can then be hydrolyzed in accordance with this invention to the vicinal glycol derivatives of the parent acids. For example, oleic acid is reacted with chlorine in acetic acid solvent and yields 9,10-dichlorostearic acid. Subsequent reaction of the 9,10-dichlorostearic acid with water in an amide solvent according to the process of this invention yields 9,10-dihydroxystearic acid. Likewise, reaction of vaccenic acid with bromine in acetic acid solvent yields 11,12-dibromostearic acid. Subsequent reaction of 11,12-dibromostearic acid with water in an amide solvent yields 11,12-dihydroxystearic acid. Likewise, reaction of erucic acid with iodine in an acetic acid solvent yields 13,14-diiodobehenic acid. Subsequent reaction of 13,14-diiodobehenic acid with water in an amide solvent yields 13,14-dihydroxybehenic acid. A preferred acid for use herein is 9,10-dichlorostearic acid.

Commercially available mixtures of unsaturated fatty acids and their alkyl esters obtainable from a wide variety of natural animal and plant fats and waxes can be vicinally halogenated at the position of unsaturation and subsequently hydrolyzed to the corresponding glycols in the practice of the present invention. Common sources of fatty acids such as palm oil, peanut oil, corn oil, linseed oil, soybean oil, lard, tallow and the like, on hydrolysis, yield unsaturated acids which, when halogenated at the olefinic positions, are converted into vicinal dihalides which are then hydrolyzed to the corresponding glycols by the present process. Likewise, the alkyl and aryl esters of these unsaturated acids can be vicinally halogenated in the usual manner and can then be hydrolyzed to the corresponding glycol. Also present in such mixtures are various saturated fatty acids which are not halogenated and are present as mere diluents. These in no way interfere with the subsequent hydrolysis of the vicinal dihalide derivatives of the fatty acids and esters to their corresponding vicinal glycols according to the process of this invention. Soybean oil, tallow and lard fatty acid mixtures are preferred for economic reasons.

Alternatively, those glyceride esters containing unsaturated fatty acids which are present in the natural fats and oils can be reacted with halogens to yield the corresponding dihalide derivatives wherein the two halogen atoms are vicinally substituted at the original positions of unsaturation in the glyceride esters. These vicinally halogenated glyceride esters can be subsequently reacted with water in an amide solvent according to the process of this invention to yield the corresponding vicinal glycol derivatives of the parent glyceride esters. The vicinal glycol derivatives of the glyceride esters present in palm oil, peanut oil, corn oil, linseed oil, tallow, lard, soybean oil, babassu oil, Neat's foot oil, whale oil, and the like are thereby prepared by the process of this invention. Mono-, di- and triglyceride esters can be employed.

The amide solvent suitable for use in the practice of the present invention can be any of a wide variety of amide solvents, preferably those in which the vicinal dihalides and water are mutually soluble. However, it is not critical that the vicinal dihalide and water be mutually soluble in the amide solvent since the hydrolysis of vicinal dihalides to their corresponding vicinal glycols occurs even in two-phase reaction systems in the present process. When such two-phase systems are used, it is merely necessary to employ efficient mixing so as to insure good dispersion of the reactants in the solvent. As is hereinbelow noted, it is desirable to perform the hydrolysis reaction of this invention at temperatures well above room temperature. Various amides which are solids at room temperature but which liquify at the desired reaction temperatures, i.e., above about 150° C, can be employed as solvents in the reaction.

Amides having the general formula $R'C(O)NR'R'$, wherein each $R'$ is selected from the group consisting of hydrogen, alkyl groups having from about one to about 20 carbon atoms, and preferably from about one to about 10 carbon atoms, and phenyl are suitable for use in the present process.

Non-limiting examples of N,N-disubstituted amides suitable for use as the solvent in the practice of this invention include: dimethylformamide, diethylformamide, dipropylformamide, dibutylformamide, dioctylformamide, didecylformamide, dimethylacetamide, dimethylpropionamide, dimethylbutyramide, dimethylpentanamide, dimethyloctanamide, dimethyldecanamide, diethylacetamide, dipropylpropionamide, dibutylbutyramide, dipropylbutyramide, dioctyldecanamide, didecyldecanamide, diphenylacetamide, diphenylbenzamide, dimethyleicosanamide, didecylhexadecanamide, di-eicosyleicosanamide and methylphenylacetamide. Any of these amides can be prepared by the condensation of the corresponding acid or acid halide with the corresponding dialkyl or diaryl amine in the manner well-known in the art. Certain tetralkyldiamides can also be employed as the solvent in the present process. For example, N,N,N'N'-tetraalkyldiamides of oxalic acid, succinic acid, malonic acid, etc., wherein the alkyl groups are those hereinbefore noted as suitable for use in the monoamide materials useful as solvents in this invention, can be used.

Various alkanoyl amides unsubstituted on the nitrogen functionality are also suitable for use herein. Non-limiting examples of such amides include: formamide, acetamide, propionamide, butyramide, pentanamide, decanamide, tetradecanamide, hexadecanamide, benzamide, cyclohexanamide and eicosanamide, all of which are suitable. Any of these amides can be preprepared by the condensation of the corresponding acid or acid halide with ammonia in the manner well-known in the art.

Likewise, mono-N-substituted amides are suitable for use in the present process. Non-limiting examples of amides suitable for use herein include methylformamide, ethylformamide, propylformamide, ethylacetamide, phenylbenzamide, ethylformamide, propylformamide, ethylacetamide, phenylbenzamide, decyleicosan-amide, phenylcyclohexanamide and decylbenzamide. Any of these amides can be prepared from the corresponding amines and acids or acid halides as hereinbefore noted.

Especially preferred amide solvents suitable for use herein are formamide and dimethylformamide.

In a typical hydrolysis of vicinal dihalides to vicinal glycols by the present process, a mixture of the vicinal halide, water, and amide solvent are charged in a glass lined rocking autoclave in a pressurized atmosphere of an inert gas. The reaction mixture is heated with concurrent mixing for suitable time periods. The resulting solutions are then poured into an excess of water and the water solution extracted with successive portions of a solvent such as diethyl ether. The solvent extracts are evaporated and the vicinal glycols are thereby recovered.

The ranges of reaction temperatures employed in the process of this invention are from about 150°C to about 300°C and preferably from about 160°C to about 210°C. At the lower reaction temperatures, e.g., 150°C, the reaction rate for the hydrolysis is inconveniently slow, although the reaction does occur. At temperatures above about 300°C, thermal decomposition of the reactants occurs. At the higher reaction temperature range the amide solvent must be selected from the more thermally stable members of the group hereinbefore described.

The pressure at which the hydrolysis reaction of this invention is run is not critical to the reaction products formed. Preferably, the inert gas atmosphere used in the reaction vessel is held at from about 150 pounds pressure to about 2200 pounds pressure and usually from about 200 pounds pressure to about 500 pounds pressure. The inert gas used to achieve these pressures can be any of well-known inert gases useful for such purposes, for example, nitrogen, helium, argon, neon, and the like. Nitrogen is most commonly used because of its cost advantage. Of course, the inert gas is not involved in the reaction per se but serves in the normal fashion to exclude atmospheric oxygen which could oxidize the reactants.

The reaction times used in the process of this invention are not critical in that the reaction products do not depend thereon. However, the extent to which the vicinal dihalides are hydrolyzed to the vicinal glycols, i.e., the completeness of the reaction, does depend on the reaction time and temperature. In general, reaction times of from about 1 hour to about 6 hours at temperatures of about 200°C give good yields of the vicinal glycols from their corresponding vicinal dichlorides, depending on the molar concentrations of reactants. The reaction of vicinal dibromides is, perhaps, somewhat faster than with the vicinal dichlorides.

The ratio of water to vicinal dihalide is not critical except that there should be present at least one equivalent of water per atom of halogen present in the vicinal dihalide, i.e., 2 moles of water per mole of dihalide, to achieve completion of the hydrolysis. Most conveniently, about a five-fold excess of water based on the amount of chlorine in the vicinal dihalide is used; however, this is not critical.

About a five to fifty-fold volume excess of amide solvent, based on the volume of water and vicinal dihalide being reacted, is commonly employed.

Catalytic amounts of iodide ion have been found to increase both the rate and product yield of the hydrolysis reaction of this invention. Thus, while the reaction proceeds satisfactorily in the absence of iodide ion, somewhat better product yields can be realized when iodide ion is present in the reaction mixtures. For this reason a catalytically 0.1 effective amount, e.g., from about 0.001 mole to about 0.1 mole, of any soluble iodide salt can be dissolved in the reaction mixture. Especially preferred for such use as catalyst are lithium iodide, sodium iodide, potassium iodide, tetramethylammonium iodide and tetraethylammonium iodide.

The following examples serve to illustrate the present invention and are not intended to be limiting thereof.

EXAMPLE I

Hydrolysis of 1,2-Dichlorodecane in Dimethylformamide

In a 200 ml glass lined autoclave was placed 10.45 g. (0.05 moles) of 1,2-dichlorodecane, 5.4 g. (0.3 moles) of water, and 50 m. of dimethylformamide. The mixture was heated in the rocking autoclave for 4 hours at 190°C under 200 pounds $N_2$ pressure. The resulting solution was poured into 300 ml. of water and extracted with three-150 ml. portions of diethylether. The combined ether extracts were dried and distilled to yield 1.36 g. (13 percent) of dichloride starting material, b.p. 74°–77°C (0.55 mm. hg) and 4.35 g. (50 percent) of 1,2-dihydroxydecane, b.p. 103°–106° C (0.2 mm. Hg).

In the above reaction, an equivalent amount of 1,2-dibromodecane is substituted for the 1,2-dichlorodecane, the reaction is carried out at 250°C rather than 190°C and the dimethylformamide is replaced by an equivalent amount of dimethylpropionamide, methyldecanamide, butyramide, benzamide, naphthanamide and N-methyl-N-propyldecanamide, respectively, with comparable results.

EXAMPLE II

Hydrolysis of 1,2Dichlorodecane in Formamide with Iodide Catalysis

In a glass lined rocking autoclave was placed 7.01 g. (0.033 moles) of 1,2dichlorodecane, 10 ml of water, and 90 ml of formamide. Several crystals of potassium iodide were added and the mixture was heated at 175°C for 4 hours under 2200 pounds $N_2$ pressure. The residue was cooled, poured into 300 ml of water, and extracted with three-150 ml portions of diethylether. The combined ether extracts were dried and the ether was removed by distillation. Gas-liquid chromatographic analysis of the residue showed the product to contain 69 percent of the 1,2-dihydroxydecane and an additional 7 percent of the diol monoformate. The diol crystallized directly from the residue after removal of the ether as a white crystalline solid, m.p. 45°–48°C.

In the above reaction an equivalent amount of lithium iodide, sodium iodide, tetramethylammonium iodide, and tetraethylammonium iodide, respectively, are substituted for the potassium iodide, and the reaction is carried out at 150°C and 300°C, respectively, with substantially similar results.

The 1,2-dichlorodecane is replaced with an equivalent amount of 1,2-dichlorooctane, 1,2-dichlorododecane, 1,2-dichlorotetradecane, 1,2-dichlorohexadecane 1,2-dichlorooctadecane, 1,2-dibromodecane, 1,2-diiododecane, 1-bromo-2-chlorodecane, 1-iodo-2-bromodecane, and 1-chloro-2-iododecane, respectively, and the same results are obtained in that the 1,2-dihaloalkane is converted to the corresponding 1,2-dihydroxyalkane.

EXAMPLE III

Hydrolysis of 1,2-Dichlorodecane in Dimethylacetamide

In a glass lined rocking autoclave was placed 10.45 g. (0.05 moles) of 1,2-dichlorodecane, 5.4 ml of water, and 50 ml of dimethylacetamide. The mixture was heated at 190°C for 40 hours under 200 pounds of $N_2$ pressure. The residue was poured into 300 ml of cold water and extracted with three-150 ml portions of ether. The residue after distillation of the ether from the combined extracts was shown to contain 1,2-dihydroxydecane.

The 1,2-dichlorodecane is replaced with an equivalent amount of 1,2-dichlorooctane, 3,4dichlorodecane, 1,2dichlorododecane, 1,2-dichlorotetradecane, 1,2dichlorohexadecane, 1,2-dichlorooctadecane, 1,2dichloroeicosane, 9,10-dichlorostearic -dichlorostearic acid, and 11,12-dibromostearic acid, respectively, and the corresponding glycols are secured.

EXAMPLE IV

Hydrolysis of 1,2Dichlorodecane in Dimethylformamide with Iodide Catalysis

A total of 700 g. (0.033 moles) of 1,2dichlorodecane, 10 ml of water, 90 ml of dimethylformamide, and several crystals of KI were placed in a glass lined rocking autoclave and heated to C for 4 hours under 2200 pounds $N_2$ pressure. The product was poured into 300 ml $H_2 0$ and extracted with three-150 ml portions of ether. The ether was removed from the combined extracts leaving 75 percent of 1,2-dihydroxydecane which was crystallized directly from the residue. The mother liquors were shown to contain an additional 4 percent of the diol as the monoformate ester.

An equivalent amount of 1,2-dibromocyclohexane, 1,2-dichlorododecane, 1,2-dichlorotetradecane, 1,2-dichlorohexadecane, 1,2-dichlorooctadecane, 1,2-dichlorocyclododecane, 1,2-dibromocycloeicosane, 2,3-dichloropentane, 2,3-diiodoheptane, 1-bromo-2-chlorooctane, 1,2-dichloroheneicosene, and 1,2-dichlorotetraphenylethane, respectively, are substituted for the 1,2-dichlorodecane and the following compounds are secured: 1,2-dihydroxycyclohexane, 1,2-dihydroxydodecane, 1,2-dihydroxytetradecane, 1,2dihydroxyhexadecane, 1,2-dihydroxyoctadecane, 1,2-dihydroxycyclododecane, 1,2dihydroxycycloeicosane, 2,3-dihydroxypentane, 2,3-dihydroxyheptane, 1,2-dihydroxyoctane, 1,2-dihydroxyheneicosane and 1,2-dihydroxytetraphenylethane.

EXAMPLE V

Hydrolysis of Chlorinated Tallow Fatty Acids

A mixture of tallow fatty acids (11.36 g.) is chlorinated with $Cl_2$ gas. The chlorinated mixture is placed in a glass lined autoclave with 10 ml of water and 90 ml of dimethylformamide (DMF) and heated to 200°C for 4 hours. The DMF solvent is removed at 25°–30C under vacuum and the residue washed several times with water. The residue is extracted with 50 ml of hexane and the lower layer is filtered to yield 9,10-dihydroxystearic acid. The hexane layer is evaporated leaving essentially pure stearic acid.

In the above reaction, mixtures of fatty acids obtained from palm oil, peanut oil, corn oil, linseed oil, soybean oil, lard, babassu oil, and Neat's-foot oil, respectively, are substituted for the tallow fatty acids with comparable results in that the vicinal dichloride derivatives of the unsaturated acids present in these oils are converted to their respective vicinal glycol derivatives.

The chlorinated fatty acids are replaced with an equivalent amount of brominated fatty acid in this reaction, the inert gas pressure is maintained at 1000 pounds and the temperature is maintained at 220°C; substantially equivalent results are obtained in that 9,10-dihydroxystearic acid is formed.

EXAMPLE VI

Hydrolysis of the Vicinal Dichloride Derivative of Unhydrolyzed Soybean Oil

Unhydrolyzed soybean oil is chlorinated at the positions of unsaturation by passing chlorine gas through the oil. The vicinally chlorinated oil is placed in a glass lined autoclave with an excess of water, said excess being based on the uptake of chlorine by the unsaturated oil, and a ten-fold excess, by volume, of formamide. The pressure in the autoclave is maintained at about 500 pounds nitrogen pressure. The reaction mixture is heated with shaking at about 200°C for about 4 hours. The formamide is removed and the resulting residue of the vicinal glycol derivative of soybean oil is recovered by fractional crystallization. In a modification of the method for the preparation of the vicinal glycol derivatives of soybean oil, a few crystals of potassium iodide are added to the described reaction mixture to catalyze the reaction. The product of this hydrolysis reaction is the vic-polyglycol of soybean oil.

An equivalent amount (based on the atoms of chlorine present) of vicinally chlorinated palm oil, vicinally chlorinated peanut oil, vicinally chlorinated corn oil, vicinally chlorinated linseed oil, vicinally chlorinated babassu oil, and vicinally chlorinated Neat's-foot oil is substituted for the vicinally chlorinated soybean oil in this reaction and comparable results are obtained in that the vicinally chlorinated derivatives of these oils are converted to their respective vicinally hydroxylated derivatives.

In the above reaction the formamide solvent is replaced with an equivalent amount of methylformamide, dimethylformamide, acetamide, methylacetamide, and dimethylacetamide, respectively, and the same results are obtained in that the vicinally chlorinated unhydrolyzed oils are converted to their vicinally hydroxylated derivatives.

When the above reaction is carried out at 160°C and 300°C, respectively, the same results are obtained in that the vicinally chlorinated oils are converted to their vicinally hydroxylated oils.

The vicinally chlorinated oils are replaced with an equivalent amount of corresponding vicinally brominated and vicinally iodinated oils, respectively, and the same results are obtained in that the bromine and iodine derivatives of the oils are converted to their respective vicinal glycol derivatives.

What is claimed is:

1. A process for the preparation of vicinal glycols comprising hydrolyzing non-fluoride vicinal dihalides in an amide solvent at a temperature from about 150°C to about 300°C.

2. A process according to claim 1 wherein the amide solvent is a member selected from the group consisting of formamide and dimethylformamide.

3. A process according to claim 1 wherein the vicinal dihalide is 9,10dichlorostearic acid.

4. A process according to claim 1 wherein the vicinal dihalide is a member selected from the group consisting of 1,2-dichlorooctane, 1,2-dichlorodecane, 1,2-dichlorododecane, 1,2-dichlorotetradecane, 1,2-dichlorohexadecane, and 1,2-dichlorooctadecane.

5. A process according to claim 1 wherein the vicinal dihalide is vicinally chlorinated soybean oil.

6. A process according to claim 2 wherein the reaction is carried out at about 160°-210°C.

7. A process according to claim 2 wherein the vicinal dihalide is 1,2-dichlorodecane, and the reaction temperature is about 150°-210°C.

8. A process according to claim 2 wherein the vicinal dihalide is 1,2-dichlorodecane, the solvent is formamide and the reaction temperature is about 160°-210 °C.

9. A process according to claim 2 wherein the vicinal dihalide is a mixture of vicinally chlorinated tallow fatty acids, and the reaction temperature is about 160°-210°C.

10. A process according to claim 2 wherein the vicinal dihalide is a mixture of vicinally chlorinated soybean oil fatty acids, and the reaction temperature is about 160°-210°C.

11. A process according to claim 1 wherein a catalytically effective amount of a soluble iodide salt is added to the reaction mixture.

12. A process for the preparation of vicinal glycols comprising hydrolyzing vicinal dihalides of the type

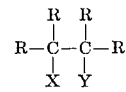

wherein X and Y are each selected from the group consisting of bromine, chlorine and iodine and each R is selected from the group consisting of hydrogen, alkyl, cycloalkyl, branched-chain alkyl, hydroxyalkyl, fluoroalkyl, alkoxyalkyl, nitroalkyl and carboxyalkyl containing from about one to about 25 carbon atoms and aryl in the presence of an amide solvent of the type

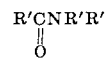

wherein each R' is selected from the group consisting of hydrogen, alkyl groups having from about one to 20 carbon atoms and phenyl at a temperature from about 150°C to about 300°C.

* * * * *